United States Patent
Lim et al.

(10) Patent No.: US 9,668,267 B2
(45) Date of Patent: May 30, 2017

(54) METHOD AND APPARATUS FOR CONTROLLING INTERFERENCE IN WIRELESS COMMUNICATION SYSTEM

(71) Applicant: LG ELECTRONICS INC., Seoul (KR)

(72) Inventors: Jaewon Lim, Anyang-si (KR); Kijun Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 88 days.

(21) Appl. No.: 14/431,682

(22) PCT Filed: Sep. 13, 2013

(86) PCT No.: PCT/KR2013/008296
§ 371 (c)(1),
(2) Date: Mar. 26, 2015

(87) PCT Pub. No.: WO2014/051285
PCT Pub. Date: Apr. 3, 2014

(65) Prior Publication Data
US 2015/0257164 A1    Sep. 10, 2015

Related U.S. Application Data

(60) Provisional application No. 61/706,735, filed on Sep. 27, 2012.

(51) Int. Cl.
*H04W 72/08*    (2009.01)
*H04L 5/00*    (2006.01)
(Continued)

(52) U.S. Cl.
CPC ......... *H04W 72/082* (2013.01); *H04L 5/0073* (2013.01); *H04L 43/04* (2013.01);
(Continued)

(58) Field of Classification Search
CPC .................................................. H04W 72/082
See application file for complete search history.

(56) References Cited

U.S. PATENT DOCUMENTS

2012/0033603 A1    2/2012  Seo et al.
2012/0040707 A1    2/2012  Kim et al.
(Continued)

FOREIGN PATENT DOCUMENTS

KR    10-2011-0119777 A    11/2011
WO    WO 2012/060602 A2    5/2012
(Continued)

*Primary Examiner* — Jason Mattis
(74) *Attorney, Agent, or Firm* — Birch, Stewart, Kolasch & Birch, LLP

(57) ABSTRACT

The method for a first base station for controlling interference between base stations in a wireless communication system according to one embodiment of the present invention comprises a step of receiving, from a second base station, fully blank subframe (FBS)-related information in which transmission power is set to zero (0) in a downlink control region and a downlink data region; and a step of transmitting resource allocation information based on the FBS-related information to a user device. The FBS-related information may be determined based on the almost blank subframe (ABS) pattern information of the second base station.

12 Claims, 11 Drawing Sheets

| | SF #n | SF #n+1 | SF #n+2 | SF #n+3 | SF #n+4 | SF #n+5 | SF #n+6 | SF #n+7 | SF #n+8 | SF #n+9 |
|---|---|---|---|---|---|---|---|---|---|---|
| DL | FBS | ABS | normal subframe | normal subframe | normal subframe | FBS | ABS | normal subframe | normal subframe | normal subframe |
| ABS pattern | 0 | 1 | 0 | 0 | 0 | 0 | 1 | 0 | 0 | 0 |
| FBS pattern | 1 | 0 | 0 | 0 | 0 | 1 | 0 | 0 | 0 | 0 |

(51) Int. Cl.
*H04L 12/26* (2006.01)
*H04W 24/08* (2009.01)
*H04W 16/00* (2009.01)
*H04W 84/04* (2009.01)

(52) U.S. Cl.
CPC ........... *H04W 16/00* (2013.01); *H04W 24/08* (2013.01); *H04L 5/001* (2013.01); *H04L 5/0091* (2013.01); *H04W 84/045* (2013.01)

(56) References Cited

U.S. PATENT DOCUMENTS

| | | | |
|---|---|---|---|
| 2012/0157082 A1* | 6/2012 | Pedersen | H04W 24/10 455/422.1 |
| 2013/0194950 A1* | 8/2013 | Haghighat | H04W 24/02 370/252 |
| 2013/0215785 A1 | 8/2013 | Jung et al. | |
| 2015/0146686 A1* | 5/2015 | Huang | H04W 36/08 370/331 |

FOREIGN PATENT DOCUMENTS

| | | |
|---|---|---|
| WO | WO 2012/060608 A2 | 5/2012 |
| WO | WO 2012/096521 A2 | 5/2012 |
| WO | WO 2012/086945 A2 | 6/2012 |

\* cited by examiner

FIG. 8

| DL | SF #n | SF #n+1 | SF #n+2 | SF #n+3 | SF #n+4 | SF #n+5 | SF #n+6 | SF #n+7 | SF #n+8 | SF #n+9 |
|---|---|---|---|---|---|---|---|---|---|---|
| | FBS | ABS | normal subframe | normal subframe | normal subframe | FBS | ABS | normal subframe | normal subframe | normal subframe |
| ABS pattern | 1 | 1 | 0 | 0 | 0 | 1 | 1 | 0 | 0 | 0 |
| FBS pattern | 1 | 0 | 0 | 0 | 0 | 1 | 0 | 0 | 0 | 0 |

FIG. 9

| DL | SF #n | SF #n+1 | SF #n+2 | SF #n+3 | SF #n+4 | SF #n+5 | SF #n+6 | SF #n+7 | SF #n+8 | SF #n+9 |
|---|---|---|---|---|---|---|---|---|---|---|
| | FBS | ABS | normal subframe | normal subframe | normal subframe | FBS | ABS | normal subframe | normal subframe | normal subframe |
| ABS pattern | 0 | 1 | 0 | 0 | 0 | 0 | 1 | 0 | 0 | 0 |
| FBS pattern | 1 | 0 | 0 | 0 | 0 | 1 | 0 | 0 | 0 | 0 |

FIG. 10

| DL | SF #n | SF #n+1 | SF #n+2 | SF #n+3 | SF #n+4 | SF #n+5 | SF #n+6 | SF #n+7 | SF #n+8 | SF #n+9 |
|---|---|---|---|---|---|---|---|---|---|---|
| | FBS | ABS | normal subframe | normal subframe | normal subframe | FBS | ABS | normal subframe | normal subframe | normal subframe |
| ABS/FBS pattern | 1 | 0 | 0 | 0 | 0 | 1 | 0 | 0 | 0 | 0 |
| | 0 | 1 | 0 | 0 | 0 | 1 | 1 | 0 | 0 | 0 |

METHOD AND APPARATUS FOR CONTROLLING INTERFERENCE IN WIRELESS COMMUNICATION SYSTEM

CROSS REFERENCE TO RELATED APPLICATIONS

This application is the National Phase of PCT/KR2013/008296 filed on Sep. 13, 2013, which claims priority under 35 U.S.C. 119(e) to U.S. Provisional Application No. 61/706,735 filed on Sep. 27, 2012, all of which are hereby expressly incorporated by reference into the present application.

TECHNICAL FIELD

The present invention relates to a method of controlling interference in a wireless communication system and an apparatus therefor.

BACKGROUND ART

Recently, such various devices and technologies requiring high data traffic as M2M (machine-to-machine) communication, a smartphone, a tablet PC and the like are emerged and disseminated. As a result, data traffic required to be processed in a cellular network is rapidly increasing. In order to satisfy the rapidly increasing data processing demand, a carrier aggregation technology, a cognitive radio technology, and the like are developing to efficiently use more frequency bands. And, a multi-antenna technology, a multi-base station cooperation technology, and the like are developing to increase data capacity transmitted in a limited frequency band. Communication environment is evolving to a direction that dense of neighboring nodes capable of being accessed by a user equipment is increasing. In this case, a node corresponds to a fixed point capable of transmitting and receiving a radio signal with a user equipment by installing one or more antennas in the node. A communication system equipped with nodes of high density can provide a communication service of higher performance to a user equipment with the help of cooperation between nodes.

According to a multi-node cooperative communication scheme performing communication with a user equipment using an identical time-frequency resource in a plurality of nodes, the multi-node cooperative communication scheme has vastly superior performance compared to a legacy communication scheme performing communication with a user equipment in a manner that each of a plurality of the nodes operates as an independent base station without any cooperation.

In a multi-node system, cooperative communication is performed using a plurality of nodes of which each node operates as a base station, an access point, an antenna, an antenna group, a radio remote header (RRH) or a radio remote unit (RRU). Unlike a legacy centralized antenna system of which antennas are concentrated on a base station, a plurality of the nodes are generally positioned in a manner of being apart from each other more than a prescribed space in the multi-node system. A plurality of the nodes can be managed by one or more base stations or a base station controller configured to control operation of each node or schedule data to be transmitted or received via each node. Each node is connected with a base station managing the node or the base station controller via a cable or a dedicated line.

The multi-node system may correspond to a sort of MIMO (multiple input multiple output) system in a point that distributed nodes are able to communicate with a single or a plurality of user equipments in a manner of transmitting/receiving streams different from each other at the same time. Yet, since the multi-node system transmits a signal using nodes distributed in various positions, a transmission region covered by each antenna is reduced compared to antennas installed in a legacy centralized antenna system. Hence, compared to the legacy centralized system in which MIMO technique used to be implemented, in the multi-node system, transmission necessary for each antenna to transmit a signal can be reduced. And, since a transmission distance between an antenna and a user equipment is reduced in the multi-node system, a path loss is reduced and fast transmission of data can be enabled. By doing so, transmission capacity and power efficiency of a cellular system can be enhanced and communication performance of relatively uniform quality can be satisfied irrespective of a position of a user equipment in a cell. And, since a base station(s) connected with a plurality of nodes or a base station controller(s) is cooperative in data transmission/reception, a signal loss occurring in a transmission process can be reduced. And, if nodes apart from each other more than a prescribed distance perform cooperative communication with a user equipment, correlation between antennas and interference can be reduced. Hence, according to the multi-node cooperative communication scheme, higher SINR (signal to interference-plus-noise ratio) can be obtained.

Hence, the multi-node system is coming to the fore as a new basis of a cellular communication instead of or together with a legacy centralized antenna system not only to expand service coverage and enhance channel capacity and SINR but also to reduce cost for installing more base stations and cost for maintaining a backhaul network in a next generation mobile communication system with the help of the strong point of the multi-node system.

Yet, if cooperative scheduling between multiple nodes is not achieved in the multi-node system, the strong points of the multi-node system are to be diluted due to interference between the multiple nodes. In particular, the aforementioned problems can be worsened in a wireless communication system in which such small scale cells as pico cells or femto cells are distributed. Hence, it is necessary to have a method of controlling the inter-cell interference in environment of the small scale cells.

DISCLOSURE OF THE INVENTION

Technical Task

The present invention intends to propose a method of controlling inter-cell interference in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of controlling interference between base stations, which is controlled by a first base station in a wireless communication system, includes receiving FBS (fully blank subframe)-related information indicating a subframe(s) of which transmission power of a downlink control region and a downlink data region is set to zero (0) from a second base station and transmitting resource allocation information based on the FBS-related information to a user equipment. The FBS-related information may be determined based on ABS (almost blank subframe) pattern information of the second base station.

Preferably, the FBS-related information may designate a part of subframe(s), which is designated as an ABS by the ABS pattern information of the second base station, as an FBS.

Preferably, the FBS-related information may designate a part of subframe(s), which is designated as a non-ABS by the ABS pattern information of the second base station, as an FBS.

Preferably, the FBS-related information may include an FBS start subframe, an FBS period, and an FBS duration, the FBS start subframe may correspond to a number or an index of a subframe to be firstly designated as the FBS in the ABS pattern information of the second base station, the FBS period may correspond to a period of repeating the FBS and the FBS duration may correspond to the number of subframes to be designated as the FBS for the FBS period.

Preferably, the FBS-related information may further include an overlapped subframe indicator and the overlapped subframe indicator may correspond to information indicating whether a subframe(s) designated as both an ABS and an FBS is to be determined as an ABS or an FBS.

Preferably, the method may further include transmitting information on an interference measurement set based on the FBS-related information to the user equipment and receiving a result measured in the interference measurement set from the user equipment.

To further achieve these and other advantages and in accordance with the purpose of the present invention, according to a different embodiment, a method of controlling interference between base stations, which is controlled by a user equipment in a wireless communication system, include receiving resource allocation information based on FBS (fully blank subframe)-related information from a first base station. The FBS-related information may indicate a subframe(s) of which transmission power of a downlink control region and a downlink data region is set to zero (0) and the FBS-related information may be determined based on ABS (almost blank subframe) pattern information of the second base station.

Preferably, the method may further include receiving information on an interference measurement set based on the FBS-related information from the first base station and transmitting a result measured in the interference measurement set to the first base station.

To further achieve these and other advantages and in accordance with the purpose of the present invention, according to a further different embodiment, a base station controlling interference between base stations in a wireless communication system includes an RF (radio frequency) unit and a processor configured to control the RF unit, the processor may be configured to receive FBS (fully blank subframe)-related information indicating a subframe(s) of which transmission power of a downlink control region and a downlink data region is set to zero (0) from a second base station, and transmit resource allocation information based on the FBS-related information to a user equipment. The FBS-related information may be determined based on ABS (almost blank subframe) pattern information of the second base station.

Preferably, the FBS-related information may designate a part of subframe(s), which is designated as an ABS by the ABS pattern information of the second base station, as an FBS.

Preferably, the FBS-related information may designate a part of subframe(s), which is designated as an ABS by the ABS pattern information of the second base station, as an FBS.

Preferably, the FBS-related information may include an FBS start subframe, an FBS period, and an FBS duration, the FBS start subframe may correspond to a number or an index of a subframe to be firstly designated as the FBS in the ABS pattern information of the second base station, the FBS period may correspond to a period of repeating the FBS and the FBS duration may correspond to the number of subframes to be designated as the FBS for the FBS period.

Preferably, the FBS-related information may further include an overlapped subframe indicator and the overlapped subframe indicator may correspond to information indicating whether a subframe(s) designated as both an ABS and an FBS is to be determined as an ABS or an FBS.

Preferably, the processor may be configured to transmit information on an interference measurement set based on the FBS-related information to the user equipment and receive a result measured in the interference measurement set from the user equipment.

To further achieve these and other advantages and in accordance with the purpose of the present invention, according to a further different embodiment, a user equipment controlling interference between base stations in a wireless communication system includes an RF (radio frequency) unit and a processor configured to control the RF unit, wherein the processor may be configured to receive resource allocation information based on FBS-related information from a first base station. The FBS-related information may indicate a subframe(s) of which transmission power of a downlink control region and a downlink data region is set to zero (0) and the FBS-related information may be determined based on ABS (almost blank subframe) pattern information of the second base station.

Preferably, the processor may be configured to receive information on an interference measurement set based on the FBS-related information from the first base station and transmit a result measured in the interference measurement set to the first base station.

The aforementioned solutions are just a part of embodiments of the present invention. Various embodiments to which technical characteristics of the present invention are reflected can be drawn and understood based on detail explanation on the present invention to be described in the following by those skilled in the corresponding technical field Advantageous Effects According to one embodiment of the present invention, it is able to reduce inter-cell interference in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 8 is a diagram for a wireless communication environment related to one embodiment of the present invention;

FIG. 9 is a diagram for an example of an ABS pattern related to one embodiment of the present invention;

FIG. 10 is a diagram for signaling and a procedure related to one embodiment of the present invention;

BEST MODE

Mode for Invention

Figure 1:
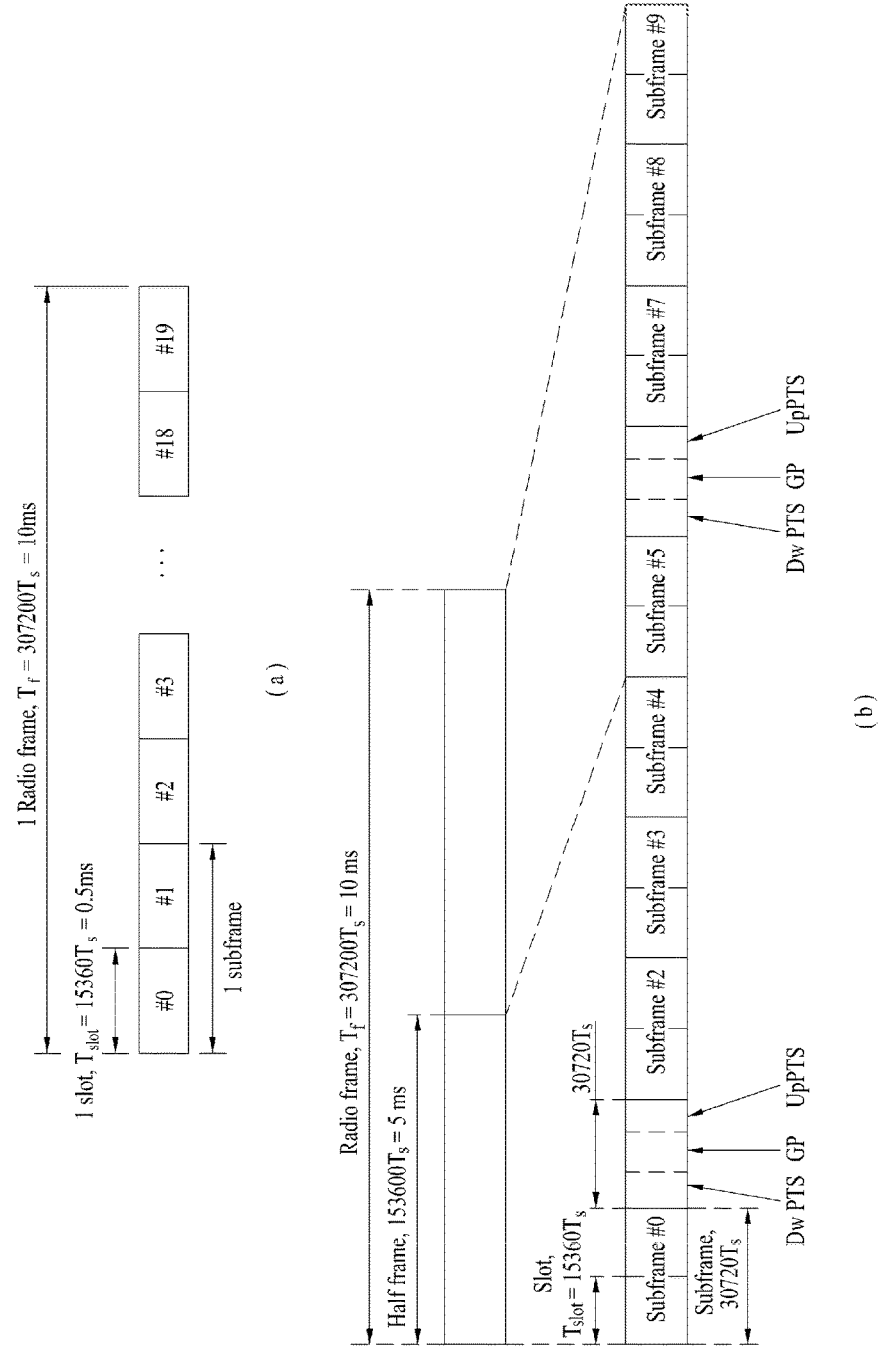
FIG. 1(a) is an exemplary radio frame structure for Frequency Division Duplex (FDD) mode in a 3GPP LTE/LTE-A system and FIG. 1(b) is an exemplary radio frame structure for Time Division Duplex (TDD) mode in the 3GPP LTE/LTE-A system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Techniques, devices, and systems as described below are applicable to various wireless multiple access systems. For the convenience of description, the following description is given of the present invention in the context of a $3^{rd}$ Generation Partnership Project (3GPP) Long Term Evolution (LTE)/LTE-Advanced (LTE-A) system, which should not be construed as limiting the present invention. For example, although the following description is given in the context of the 3GPP LTE/LTE-A system as an exemplary mobile communication system, the same thing applies to other mobile communication systems except for features inherent to the 3GPP LTE/LTE-A system.

In some instances, known structures and devices are omitted or are shown in block diagram form, focusing on important features of the structures and devices, so as not to obscure the concept of the invention. Like reference numerals denote the same components throughout the specification.

In the present invention, User Equipments (UEs) may be fixed or mobile, including various devices that transmit and receive user data and/or various types of information to and from a Base Station (BS) by communication. The term UE may be replaced with terminal equipment, Mobile Station (MS), Mobile Terminal (MT), User Terminal (UT), Subscriber Station (SS), wireless device, Personal Digital Assistant (PDA), wireless modem, handheld device, etc. A BS generally refers to a fixed station communicating with a UE and/or another BS and exchanges data and control information with a UE and another BS. The term BS may be replaced with Advanced BS (ABS), Node B (NB), evolved Node B (eNB or eNode B), Base Transceiver System (BTS), Access Point (AP), Processing Server (PS), etc.

In the present invention, a Physical Downlink Control Channel (PDCCH)/Physical Control Format Indicator Channel (PCFICH)/Physical Hybrid automatic repeat and request Indicator Channel (PHICH)/Physical Downlink Shared Channel (PDSCH) is a set of time-frequency resources or Resource Elements (REs) that deliver Downlink Control Information (DCI)/Control Format Indicator (CFI)/Downlink ACKnowledgment/Negative ACKnowledgment (DL ACK/NACK)/DL data. A Physical Uplink Control Channel (PUCCH)/Physical Uplink Shared Channel (PUSCH) is a set of time-frequency resources or REs that deliver Uplink Control Information (UCI)/Uplink (UL) data. Particularly, time-frequency resources or REs allocated to or belonging to the PDCCH/PCFICH/PHICH/PDSCH/PUCCH/PUSCH are referred to as PDCCH/PCFICH/PHICH/PDSCH/PUCCH/PUSCH resources or REs in the present invention. Thus, when it is said that a UE transmits a PUCCH/PUSCH, this means that the UE transmits UCI/UL data/random access signal on the PUCCH/PUSCH. Also, when it is said that a BS transmits a PDCCH/PCFICH/PHICH/PDSCH, this means that the BS transmits DL data/control information on the PDCCH/PCFICH/PHICH/PDSCH.

In the present invention, Cell-specific Reference Signal (CRS)/Demodulation Reference Signal (DMRS)/Channel State Information Reference Signal (CSI-RS) time-frequency resources (or REs) are time-frequency resources (or REs) that may be allocated to or are available to a CRS/DMRS/CSI-RS or time-frequency resources (or REs) carrying a CRS/DMRS/CSI-RS. A subcarrier including a CRS/DMRS/CSI-RS is referred to as a CRS/DMRS/CSI-RS subcarrier and an Orthogonal Frequency Division Multiplexing (OFDM) symbol carrying a CRS/DMRS/CSI-RS is referred to as a CRS/DMRS/CSI-RS symbol. Also, Sounding Reference Signal (SRS) time-frequency resources (or REs) are time-frequency resources (REs) carrying an SRS for a BS to use in measuring the state of a UL channel established between a UE and the BS. An RS is a predefined signal having a special waveform, known to both a BS and a UE. An RS is also called a pilot signal.

In the present invention, a cell is defined as a predetermined geographical area in which a BS, a node(s), or an antenna port(s) provides a communication service. Therefore, communication with a specific cell amounts to communication with a BS, a node, or an antenna port that provides a communication service to the specific cell. A DL/UL signal in a specific cell means a DL/UL signal from/to a BS, a node, or an antenna port that provides a communication service to the specific cell. A channel state/quality of a specific cell refers to a channel state/quality of a channel or a communication link established between a UE and a BS, a node, or an antenna port that provides a communication service to the specific cell.

FIG. 1(a) and FIG. 1(b) illustrate exemplary structure of a radio frame in a wireless communication system. Specifically, FIG. 1(a) illustrates an exemplary radio frame structure for Frequency Division Duplex (FDD) mode in a 3GPP LTE/LTE-A system and FIG. 1(b) illustrates an exemplary radio frame structure for Time Division Duplex (TDD) mode in the 3GPP LTE/LTE-A system.

Referring to FIG. 1(a) and FIG. 1(b), a radio frame is 10 ms (307,200 $T_s$) in duration in the 3GPP LTE/LTE-A system. The radio frame is divided into 10 equal-sized subframes which may be numbered, respectively. $T_s$ represents a sampling time and is given as $T_s=1/(2048\times.15$ kHz$)$. Each subframe is ms long and farther divided into two slots. The 20 slots of a radio frame may be numbered sequentially from 0 to 19. Each slot is 0.5 ms long/A unit time in which data is transmitted is defined as Transmission Time Interval (TTI). Time resources may be identified by a radio frame number (or a radio frame index), a subframe number (or a subframe index), a slot number (or a slot index), etc.

A different radio frame may be configured according to a duplex mode. For example, since DL transmission and UL transmission are distinguished from each other by frequency, a radio frame includes only DL subframes or UL subframes in a specific frequency band that operates in a specific carrier frequency in the FDD mode. In contrast, DL transmission and UL transmission are distinguished from each other by time in the TDD mode. Accordingly, a TDD radio frame includes both DL and UL subframes in a specific frequency band that operates in a specific carrier frequency.

Table 1 lists DL-UL configurations for subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D represents DL subframe, U represents UL subframe, and S represent special subframe. A special subframe includes three fields, Downlink Pilot Time Slot (DwPTS), Guard Period (GP), and Uplink Pilot Time Slot (UpPTS). The DwPTS is a time interval reserved for DL transmission and the UpPTS is a time interval reserved for UL transmission.

Figure 2:
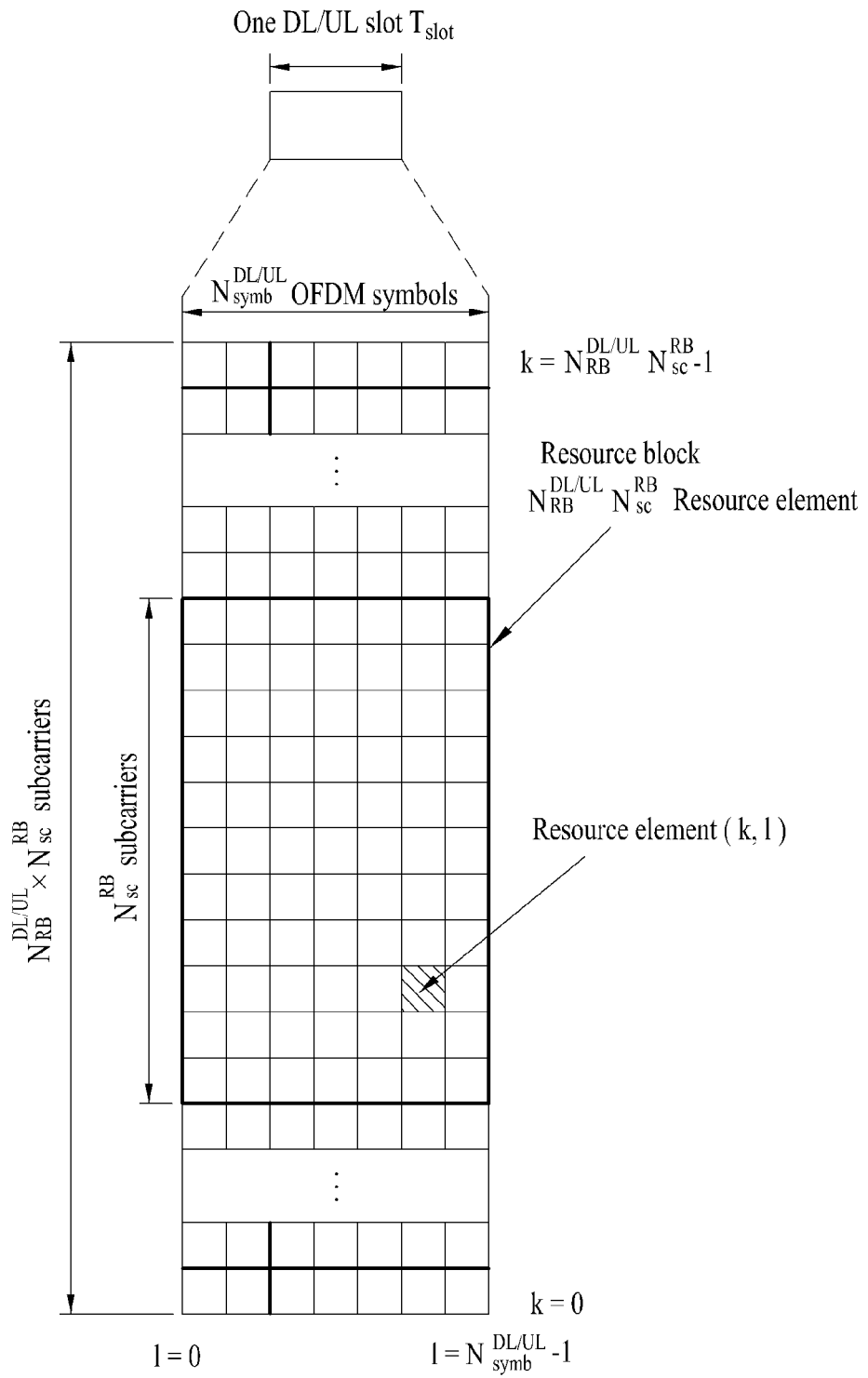
FIG. 2 is a diagram for an example of a downlink (DL)/uplink (UL) slot structure used in a wireless communication system.

FIG. 2 illustrates an exemplary structure of a DL/UL slot in a wireless communication system. Specifically, FIG. 2 illustrates the structure of a resource grid in the 3GPP LTE/LTE-A system. There is one resource grid per antenna port.

A slot includes a plurality of OFDM symbols in the time domain by a plurality of Resource Blocks (RBs) in the frequency domain. An OFDM symbol means one symbol period. Referring to FIG. 2, a signal transmitted in each slot may be represented as a resource grid including $N^{DL/UL}_{symb}$ OFDM symbols by $N^{DL/UL}_{RB} \times N^{RB}_{SC}$ subcarriers. $N^{DL}_{RB}$ represents the number of RBs in a DL slot and $N^{UL}_{RB}$ represents the number of RBs in a UL slot. $N^{DL}_{RB}$ and $N^{DL}_{RB}$ depend on a DL transmission bandwidth and a UL transmission bandwidth, respectively. $N^{DL}_{symb}$ represents the number of OFDM symbols in the DL slot and $N^{UL}_{symb}$ represents the number of OFDM symbols in the UL slot. $N^{RB}_{SC}$ represents the number of subcarriers in one RB.

An OFDM symbol may be referred to as an OFDM symbol, an SC-FDMA symbol, etc. according to multiple access schemes. The number of OFDM symbols included in one slot may vary depending on a channel bandwidth and a Cyclic Prefix (CP) length. For example, one slot includes 7 OFDM symbols in the case of normal CP, whereas one slot includes 6 OFDM symbols in the case of extended CP. While one subframe is shown in FIG. 2 as including 7 OFDM symbols in each slot for the convenience of description, the embodiments of the present invention are applicable to a subframe including a different number of OFDM symbols. Referring to FIG. 2, each OFDM symbol includes $N^{DL/UL}_{RB} \times N^{RB}_{SC}$ subcarriers in the frequency domain. Subcarriers may be categorized into data subcarrier for data transmission, RS subcarrier for RS transmission, and null subcarrier for a guard band and a Direct Current (DC) component. The null subcarrier for the DC component is an unused subcarrier mapped to a carrier frequency f0 during OFDM signal generation or frequency upconversion. The carrier frequency is also called a center frequency.

An RB is defined as $N^{DL/UL}_{symb}$ (e.g., 7) consecutive OFDM symbols in the time domain by $N^{RB}_{SC}$ (e.g., 12) consecutive subcarriers in the frequency domain. For reference, a resource including one OFDM symbol by one subcarrier is called an RE or a tone. Therefore, one RB includes $N^{DL/UL}_{symb} \times N^{RB}_{SC}$ REs. Each RE of a resource grid may be uniquely identified by an index pair (k, 1) in a slot. Herein, k represents an index ranging from 0 to $N^{DL/UL}_{RB} \times N^{RB}_{SC}-1$ in the frequency domain and 1 represents an index ranging from 0 to $N^{DL/UL}_{symb}-1$ in the time domain.

Two RBs, each located in one of the two slots of a subframe and occupying the same $N^{RB}_{SC}$ consecutive subcarriers in the subframe are called a Physical Resource Block (PRB) pair. The two RBs of a PRB pair have the same PRB number (or PRB index). A Virtual RB (VRB) is a logical resource allocation unit, which is introduced for resource allocation. A VRB is equal to a PRB in size. Two types of VRBs are defined, Localized VRB (LVRB) and Distributed VRB (DVRB) according to how VRBs are mapped to PRBs. LVRBs are mapped directly to PRBs and thus VRB numbers (or VRB indexes) are PRB numbers. That is, nPRB=nVRB. The LVRBs are numbered from 0 to NDLVRB−1 and NDLVRB=NDLRB. Therefore, according to the localized mapping, VRBs having the same VRB number are mapped to PRBs having the same PRB number in the first and second slots of a subframe. On the contrary, DVRBs are mapped to PRBs after interleaving. Accordingly, DVRBs having the same VRB number may be mapped to PRBs having different PRB numbers in the first and second slots of a subframe. Two PRBs having the same VRB number, each in one of the two slots of a subframe, is called a VRB pair.

Figure 3:
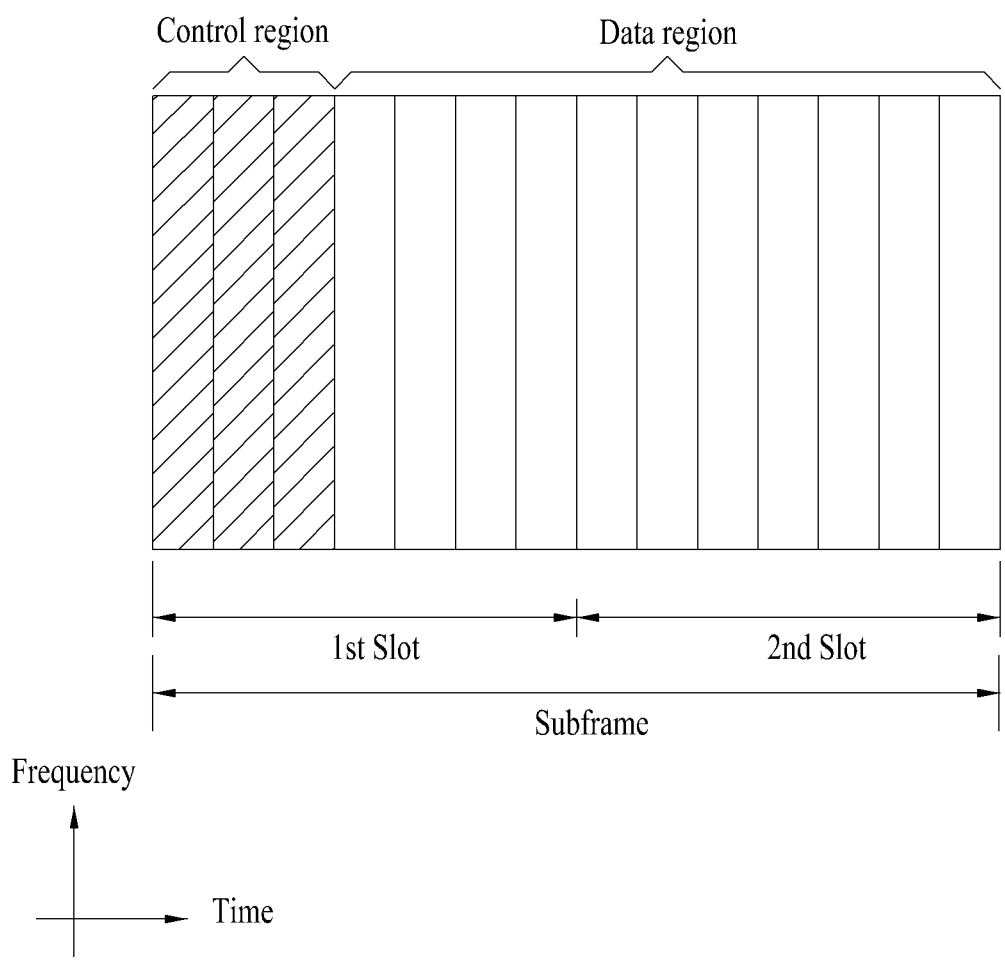
FIG. 3 is a diagram for an example of a downlink (DL) subframe structure used in 3GPP LTE/LTE-A system.

FIG. 3 illustrates the structure of a DL subframe in the 3GPP LTE/LTE-A system.

A DL subframe is divided into a control region and a data region in the time domain. Referring to FIG. 3, up to 3 (or 4) OFDM symbols at the start of the first slot of a DL subframe are used as a control region to which control channels are allocated. Hereinafter, a resource area available for PDCCH transmission in a DL subframe is referred to as a PDCCH region. The other OFDM symbols of the DL subframe except for the OFDM symbol(s) of the control region are used as a data region to which a PDSCH is allocated. Hereinafter, a resource area available for PDSCH transmission in a DL subframe is referred to as a PDSCH region. DL control channels defined for the 3GPP LTE system include PCFICH, PDCCH, PHICH, etc. The PCFICH is transmitted in the first OFDM symbol of a subframe, carrying information about the number of OFDM symbols used for transmission of control channels in the subframe. The PHICH delivers a Hybrid Automatic Repeat and reQuest (HARQ) ACK/NACK signal as a response to a UL transmission.

Control information delivered on the PDCCH is called DCI. The DCI transports resource allocation information and other control information for a UE or a UE group. For example, the DCI includes information about resource allocation and a transport format for a Downlink Shared Channel (DL-SCH), information about resource allocation and a transport format for an Uplink Shared Channel (UL-SCH), paging information on a Paging Channel (PCH), system information on the DL-SCH, information about resource allocation for a higher-layer control message such as a random access response transmitted on the PDSCH, a set of transmission power control commands for individual UEs of a UE group, a transmission power control command, Voice Over Internet Protocol (VoIP) activation indication information, etc. DCI delivered on a PDCCH has a different size and usage depending on its DCI format. The size of the DCI may vary with a coding rate.

A plurality of PDCCHs may be transmitted in the PDCCH region of a DL subframe. A UE may monitor a plurality of PDCCHs. A BS determines a DCI format according to DCI to be transmitted to a UE and adds a Cyclic Redundancy Check (CRC) to the DCI. The CRC is masked (or scrambled) by an Identifier (ID) (e.g., Radio Network Temporary Identifier (RNTI)) according to the owner or usage of a PDCCH. If the PDCCH is destined for a specific UE, the CRC may be masked by a Cell RNTI (C-RNTI) of the UE. If the PDCCH is for a paging message, the CRC of the PDCCH may be masked by a Paging RNTI (P-RNTI). If the PDCCH carries system information (particularly, a System Information Block (SIB)), its CRC may be masked by a System Information RNTI (SI-RNTI). If the PDCCH is for a random access response, the CRC of the PDCCH may be masked by a Random Access RNTI (RA-RNTI). CRC masking (or scrambling) includes, for example, XOR-operation of a CRC and an RNTI at a bit level.

A PDCCH is transmitted in an aggregate of one or more consecutive Control Channel Elements (CCEs). A CCE is a logical allocation unit used to provide a coding rate to the PDCCH based on a radio channel state. A CCE includes a plurality of Resource Element groups (REGs). For example, one CCE includes 9 REGs, each REG having 4 REs. 4 Quadrature Phase Shift Keying (QPSK) symbols are mapped to each REG. An RE occupied by an RS is excluded from an REG. Therefore, the number of REGs in a given OFDM symbol varies depending on the presence or absence of an RS. The concept of REG is also applied to other DL control channels (i.e. PCFICH and PHICH). A DCI format and the number of DCI bits are determined according to the number of CCEs.

CCEs are numbered and used consecutively. To simplify a decoding process, a PDCCH configured in a format including n CCEs may start only in a CCE having a number being a multiple of n. A BS determines the number of CCEs, that is, a CCE aggregation level used for transmission of a specific PDCCH according to a channel state. For example, one CCE may be sufficient for a PDCCH directed to a UE having a good DL channel (e.g., a UE near to the BS). However, 8 CCEs may be required for a PDCCH directed to a UE having a poor channel (e.g., a UE at a cell edge) in order to ensure robustness.

Figure 4:
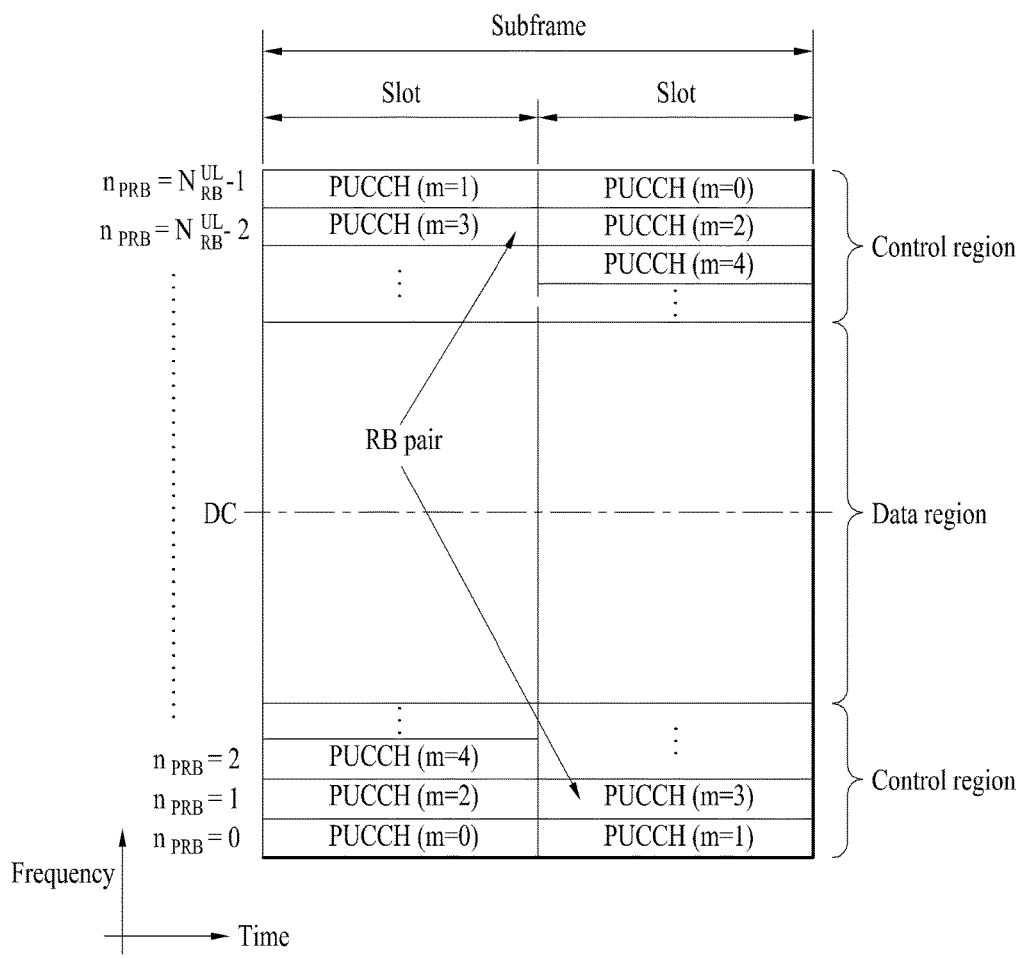
FIG. 4 is a diagram for an example of an uplink (UL) subframe structure used in 3GPP LTE/LTE-A system.

FIG. 4 illustrates an exemplary structure of a UL subframe in the 3GPP LTE/LTE-A system.

Referring to FIG. 4, a UL subframe may be divided into a control region and a data region in the frequency domain. One or more PUCCHs carrying UCI may be allocated to the control region and one or more PUSCHs carrying user data may be allocated to the data region. The control region and the data region of the UL subframe are referred to as a PUCCH region and a PUSCH region, respectively. An SRS may also be allocated to the data region. The SRS is transmitted in the last OFDM symbol of the UL subframe in the time domain and in a data transmission band, that is, the data region of the UL subframe in the frequency domain. SRSs that a plurality of UEs transmit in the last OFDM symbol of the same subframe may be distinguished from one another by frequency positions/sequences.

If a UE adopts SC-FDMA for UL transmission, the UE may not transmit a PUCCH and a PUSCH simultaneously on one carrier in a 3GPP LTE release 8 or release 9 system in order to maintain a single carrier property. In a 3GPP LTE release 10 system, a higher layer may indicate whether simultaneous transmission of a PUCCH and a PUSCH is supported.

In the UL subframe, subcarriers remote from a DC subcarrier are used as the control region. In other words, subcarriers at both ends of a UL transmission bandwidth are allocated for transmission of UCI. The DC subcarrier is a component unused for signal transmission and mapped to a carrier frequency f0 during frequency upconversion. A PUCCH for a UE is allocated to an RB pair belonging to resources operated in a carrier frequency in a subframe and the RBs of the RB pair occupy different subcarriers in the two slots of the subframe. It is said that an RB pair allocated to a PUCCH frequency-hops over a slot boundary. If frequency hopping is disabled, the RB pair occupies the same subcarriers.

The size and usage of UCI delivered on a PUCCH are different according to the format of the PUCCH. The size of the UCI may vary with a coding rate. For example, the following PUCCH formats may be defined.

TABLE 2

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, a PUCCH format 1 series and a PUCCH format 3 series are mainly used to transmit ACK/NACK information, whereas a PUCCH format 2 series is mainly used to carry Channel State Information (CSI) such as a Channel Quality Indicator (CQI)/Precoding Matrix Index (PMI)/Rank Indicator (RI).

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Carrier Aggregation

FIG. 5(a) and FIG. 5(b) are diagrams for explaining. carrier aggregation. Before carrier aggregation is explained, a concept of a cell, which is introduced to manage a radio resource in LTE-A, is preferentially explained. A cell can be comprehended as a combination of a downlink resource and an uplink resource. In this case, the uplink resource is not an essential element. Hence, a cell can consist of a downlink resource only or a combination of a downlink resource and an uplink resource. Yet, the aforementioned definition corresponds to a definition of current LTE-A release-10. In particular, a cell can consist of an uplink resource only as well. The downlink resource and the uplink resource can be called a DL CC (downlink component carrier) and an UL CC (uplink component carrier), respectively. The DL CC and the UL CC can be represented as a carrier frequency and the carrier frequency indicates a center frequency in a corresponding cell.

A cell can be classified into a primary cell (PCell) operating in a primary frequency and a secondary cell (SCell) operating in a secondary frequency. The PCell and the SCell can be commonly called a serving cell. The PCell corresponds to a cell indicated by a user equipment in case of performing an initial connection establishment process, a connection reestablishment process or a handover process. In particular, the PCell can be comprehended as a cell becoming a control-related center in carrier aggregation environment described in the following. PUCCH is assigned to a user equipment in a PCell of the user equipment and the user can transmit the PUCCH in the PCell. The SCell can be configured after RRC (radio resource control) connection configuration is completed. The SCell can be used for providing an additional radio resource. In carrier aggregation environment, the rest of serving cells except the PCell can be regarded as the SCell. If a carrier aggregation is not configured for a user equipment in RRC_CONNECTED state or a user equipment does not support a carrier aggregation, there exists one serving cell configured with PCell only. On the other hand, if a carrier aggregation is configured for a user equipment in RRC_CONNECTED state, at least one or more serving cells may exist. And, PCell and at least one or more SCells are included in all of the serving cells. After an initial security activation process has started, a network may be able to configure at least one or more SCells in addition to PCell configured in the early stage of a connection establishment process for a user equipment supporting carrier aggregation.

Figure 5:
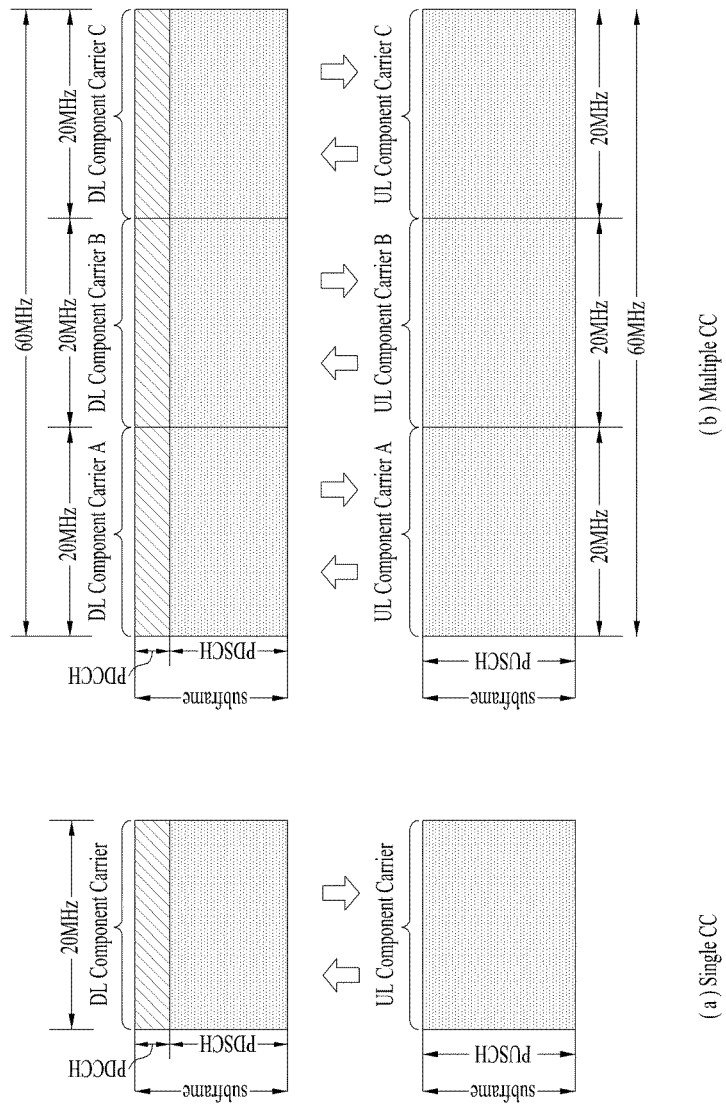
FIG. 5(a) is a subframe in case of using a single CC and FIG. 5(b) is a subframe in case of using carrier aggregation.

In the following, carrier aggregation is explained with reference to FIG. 5(a) and FIG. 5(b). Carrier aggregation corresponds to a technology introduced to enable a wider band to be used to match up demand for a fast transmission rate. Carrier aggregation can be defined by an aggregation of two or more component carriers (CCs) of which a carrier frequency is different from each other. FIG. 5 (a) shows a subframe in case of using a single CC and FIG. 5 (b) shows a subframe in case of using carrier aggregation. As an example, FIG. 5 (b) shows a case of supporting total 60 MHz by using three CCs, each of which corresponds to 20 MHz, respectively. In this case, each of the CCs can be contiguous or non-contiguous with each other.

A user equipment can simultaneously receive a downlink data via a plurality of DL CCs and can monitor the downlink data. A linkage between each of a plurality of the DL CCs and UL CC can be indicated by system information. DL CC/UL CC link can be fixed in a system or can be semi-statically configured. And, although a whole system band is configured by N number of CCs, frequency bands capable of being monitored/received by a specific user equipment can be restricted by M (<N) number of CCs. Various parameters for carrier aggregation can be configured cell-specifically, UE group-specifically, or UE-specifically.

Figure 6:
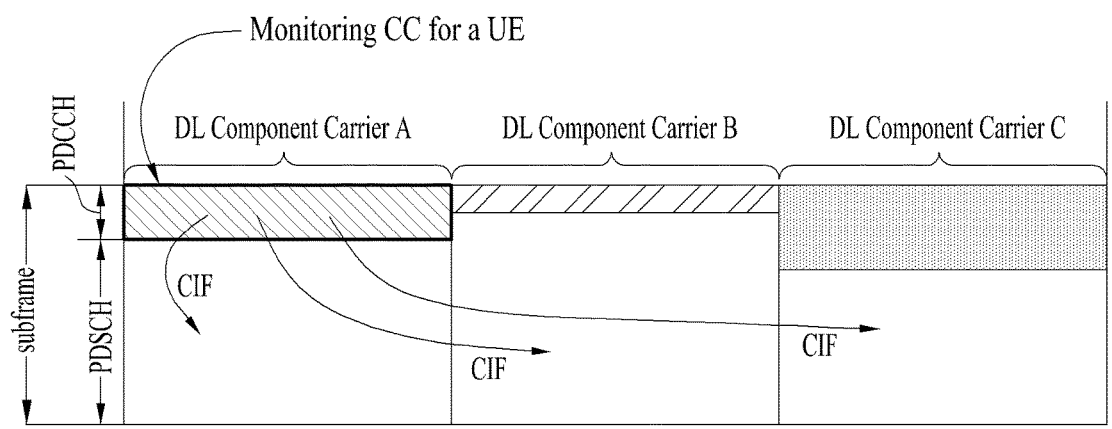
FIG. 6 is a diagram for explaining cross carrier scheduling.

FIG. 6 is a diagram for explaining cross carrier scheduling. Cross carrier scheduling means to include all downlink scheduling assignment information of a different DL CC in a control region of a DL CC among a plurality of serving cells or include all uplink scheduling grant information of a plurality of UL CCs linked with a DL CC in a control region of the DL CC among a plurality of serving cells.

First of all, a CIF (carrier indicator field) is explained.

As mentioned in the foregoing description, a CIF may be or may be not included in a DCI format transmitted on PDCCH. If a CIF is included in a DCI format, it indicates that cross carrier scheduling is applied. On the contrary, if cross carrier is not applied, downlink scheduling assignment information is valid on a DL CC on which current downlink scheduling assignment information is transmitted. And, uplink scheduling grant is valid on a single UL CC linked with a DL CC on which downlink scheduling assignment information is transmitted.

When cross carrier scheduling is applied, a CIF indicates a CC related to downlink scheduling assignment information, which is transmitted via PDCCH on a prescribed DL CC. For instance, referring to FIG. 6, downlink assignment information on a DL CC B and a DL CC C, i.e., information on a PDSCH resource is transmitted on PDCCH belonging to a control region of a DL CC A. A user equipment monitors the DL CC A and may be then able to know a resource region of PDSCH and a corresponding CC via a CIF.

Configuration for presence or non-presence of a CIF in PDCCH can be semi-statically configured and UE-specifically activated by upper layer signaling. If a CIF is disabled, PDCCH on a specific DL CC allocates a PDSCH resource on the same DL CC and a PUSCH resource on a UL CC linked with the specific DL CC. In this case, a coding scheme identical to a legacy PDCCH structure, CCE-based resource mapping, a DCI format and the like can be applied.

Meanwhile, if a CIF is enabled, PDCCH on a specific DL CC can allocate a PDSCH or PUSCH resource on a single DL/UL CC indicated by the CIF among a plurality of aggregated DL/UL CCs. In this case, a CIF can be additionally defined in a legacy PDCCH DCI format. The CIF can be defined by a field of fixed 3-bit length or a position of the CIF can be fixed irrespective of a size of a DCI format. In this case, a coding scheme identical to a legacy PDCCH structure, CCE-based resource mapping, a DCI format and the like can also be applied.

If a CIF exists, a base station can allocate a monitoring DL CC set used for monitoring PDCCH to reduce burden of blind decoding of a user equipment. The PDCCH monitoring CC set is a part of whole aggregated DL CC and a user equipment can perform detection/decoding of PDCCH on the PDCCH monitoring CC set only. In particular, a base station can transmit PDCCH on the PDCCH monitoring CC set only to schedule PDSCH/PUSCH for the user equipment. The PDCCH monitoring DL CC set can be configured UE-specifically, UE group-specifically or cell-specifically. For instance, as shown in the example of FIG. 6, in case of aggregating 3 DL CCs with each other, the DL CC A can be configured as the PDCCH monitoring DL CC. If a CIF is disabled, PDCCH on each DL CC can schedule PDSCH of the DL CC A only. Meanwhile, if a CIF is enabled, PDCCH on the DL CC A can schedule not only PDSCH of the DL CC A but also PDSCH of a different DL CC. If the DL CC A is configured as the PDCCH monitoring CC, PDSCH is not transmitted on the DL CC B and the DL CC C.

In a system to which the aforementioned carrier aggregation is applied, a user equipment can receive a plurality of PDSCHs on a plurality of downlink carriers. In this case, the user equipment may transmit ACK/NACK for each data on a single UL CC in a subframe. In case of transmitting a plurality of ACK/NACK in a subframe using a PUCCH format 1a/1b, high transmission is required, PAPR of uplink transmission is increasing, and a transmittable distance of a user equipment from a base station may be reduced due to an inefficient use of a transmission amplifier. In order to transmit a plurality of ACK/NACK on a single PUCCH, it may apply ACK/NACK bundling or ACK/NACK multiplexing.

When carrier aggregation is applied, many numbers of downlink data and/or ACK/NACK information on the many numbers of downlink data transmitted in a plurality of DL subframes may be transmitted on PUCCH in a subframe in TDD system. In this case, if ACK/NACK bit to be transmitted is greater than the number capable of being supported by the ACK/NACK bundling or the multiplexing, it is difficult to properly transmit the ACK/NACK information using the aforementioned methods.

Currently, 3GPP LTE is working on standardization of a transmission technique based on a predetermined time pattern to mitigate interference between adjacent Transmission Points (TPs) under the issue of Almost Blank Subframe (ABS). In the ABS scheme, since an aggressor cell which can cause interference in communication of neighboring cells preliminarily transmits a transmission pattern thereof, i.e., an ABS pattern, to neighboring victim cells which can receive interference from the aggressor cell, and the victim cells of the aggressor cell actively use subframes configured as ABSs by the aggressor cell to communicate with UEs connected to the victim cells, interference from the aggressor cell may be mitigated. In addition, the cell search performance and the cell maintenance performance of the UEs connected to the victim cells for communication may be improved.

A detailed description is now given of ABS.

ABS-related signaling via an X2 interface used for communication between eNBs is now described in detail. To increase the utilization of ABS, an eNB configures restricted measurement for a UE and transmits two different ABS-based measurement sets to the UE. That is, an eNB having received an ABS pattern of a neighboring cell, more specifically, an aggressor cell via an X2 interface configures measurement sets to a UE connected to the eNB based on the ABS pattern of the aggressor cell. In a legacy 3GPP LTE system, a UE should measure CRSs in all subframes to select an MCS, an RI, and a PMI. However, if a neighboring cell configures ABSs and an aggressor cell does not transmit any DL signal or transmits a DL signal with reduced power in subframes configured as the ABSs, interference varies according to an ABS pattern and thus the UE should perform subframe-specific measurement. To this end, an eNB indicates measurement of a specific subframe to a specific UE and the UE performs subframe-specific measurement. This is called restricted measurement. If a specific cell configures some of total subframes as ABSs to support restricted measurement, the cell should transmit information specifying the configured ABSs via an inter-eNB X2 interface. ABS signaling defined by 3GPP LTE-A largely includes ABS information and ABS status.

ABS information is shown in Table 3. ABS Pattern Info indicates subframes to be used as ABSs in the form of a bitmap. ABS Pattern Info is configured as a bitmap of 40 bits in FDD mode, and configured as a bitmap of up to 70 bits in TDD mode while the number of bits varies according to UL-DL configurations. For example, in the FDD mode, 40 bits indicate 40 subframes, and a bit value of 1 indicates an ABS while a bit value of 0 indicates a non-ABS. When restricted measurement is configured to a UE, the number of CRS antenna ports of a corresponding cell is signaled to the UE for CRS measurement. Measurement Subset is a subset of ABS Pattern Info. Like ABS Pattern Info, Measurement Subset is a bitmap of 40 bits in the FDD mode and is a bitmap of up to 70 bits in the TDD mode, which is a sort of recommended restricted measurement set for configuring restricted measurement to a UE.

TABLE 3

| IE/Group Name | Presence | Range | IE type and reference | Semantics description |
|---|---|---|---|---|
| CHOICE ABS Information | M | — | — | |
| >FDD | | | — | — |
| >>ABS Pattern Info | M | | BIT STRING (SIZE(40)) | Each position in the bitmap represents a DL subframe, for which value "1" indicates 'ABS' and value "0" indicates 'non ABS'. The first position of the ABS pattern corresponds to subframe 0 in a radio frame where SFN = 0. The ABS pattern is continuously repeated in all radio frames. The maximum number of subframes is 40. |
| >>Number Of Cell-specific Antenna Ports | M | | ENUMERATED (1, 2, 4, . . .) | P (number of antenna ports for cell-specific reference signals) defined in TS 36.211 [10] |
| >>Measurement Subset | M | | BIT STRING (SIZE(40)) | Indicates a subset of the ABS Pattern Info above, and is used to configure specific measurements towards the UE. |
| >TDD | | | — | — |
| >>ABS Pattern Info | M | | BIT STRING (1 . . . 70, . . .) | Each position in the bitmap represents a DL subframe for which value "1" indicates 'ABS' and value "0" indicates 'non ABS'. The maximum number of subframes depends on UL/DL subframe configuration. The maximum number of subframes is 20 for UL/DL subframe configuration 1~5; 60 for UL/DL subframe configuration 6; 70 for UL/DL subframe configuration 0. UL/DL subframe configuration defined in TS 36.211 [10]. The first position of the ABS pattern corresponds to subframe 0 in a radio frame where SFN = 0. The ABS pattern is continuously repeated in all radio frames, and restarted each time SFN = 0. |
| >>Number Of Cell-specific Antenna Ports | M | | ENUMERATED (1, 2, 4, . . .) | P (number of antenna ports for cell-specific reference signals) defined in TS 36.211 [10] |
| >>Measurement Subset | M | | BIT STRING (1 . . . 70, . . .) | Indicates a subset of the ABS Pattern Info above, and is used to configure specific measurements towards the UE |
| >ABS Inactive | M | | NULL | Indicates that interference coordination by means of almost blank sub frames is not active |

Table 4 shows ABS status IE. ABS status IE is used to help an eNB to determine whether to change an ABS pattern. Usable ABS Pattern Info is a subset of ABS Pattern Info in the form of a bitmap, which indicates whether subframes configured as ABSs are appropriately used for interference mitigation. DL ABS status specifies a ratio between the number of DL RBs scheduled for subframes indicated by Usable ABS Pattern Info and the number of RBs allocated to UEs to be protected through ABSs among the DL RBs, which indicates how efficiently ABSs have served their purpose in a victim cell.

TABLE 4

| IE/Group Name | Presence | Range | IE type and reference | Semantics description |
|---|---|---|---|---|
| DL ABS status | M | | INTEGER (0 . . . 100) | Percentage of used ABS resources. The numerator of the percentage calculation consists of resource blocks within the ABS indicated in the Usable ABS Pattern Info IE allocated by the eNB2 for UEs needing protection by ABS from inter-cell interference for DL scheduling, or allocated by the eNB2 for other reasons (e.g. some control channels). The denominator of the percentage calculation is the total quantity of resource blocks within the ABS indicated in the Usable ABS Pattern Info IE. |
| CHOICE Usable ABS Information | M | | — | — |
| >FDD | | | — | — |
| >>Usable ABS Pattern Info | M | | BIT STRING (SIZE(40)) | Each position in the bitmap represents a subframe, for which value "1" indicates 'ABS that has been designated as protected from inter-cell interference by the eNB1, and available to serve this purpose for DL scheduling in the eNB2' and value "0" is used for all other subframes. The pattern represented by the bitmap is a subset of, or the same as, the corresponding ABS Pattern Info IE conveyed in the LOAD INFORMATION message from the eNB1. |
| >TDD | | | — | — |
| >>Usable ABS Pattern Info | M | | BIT STRING (1 . . . 70) | Each position in the bitmap represents a subframe, for which value "1" indicates 'ABS that has been designated as protected from inter-cell interference by the eNB1, and available to serve this purpose for DL scheduling in the eNB2' and value "0" is used for all other subframes. The pattern represented by the bitmap is a subset of, or the same as, the corresponding ABS Pattern Info IE conveyed in the LOAD INFORMATION message from the eNB1. |

As mentioned in the foregoing description, a measurement subset configured by a subset of an ABS pattern corresponds to a subframe statically used as an ABS. Other subframes included in the ABS pattern can determine whether an eNB autonomously utilizes an ABS according to a traffic load.

Table in the following shows an invoke indication IE. The invoke indication can be used when a specific eNB requests information of a specific type to a neighboring eNB. If a neighboring eNB performs an ABS operation, the invoke indication can be used to request ABS information on an ABS pattern set to the neighboring eNB.

As described above, when a plurality of TPs placed in an aggressor-victim relationship in terms of interference pre-determines their transmission patterns specifying transmission and reception timings thereof through mutual scheduling, a UE located at a geographical point communicable with all corresponding cells may communicate with a specific TP at an available transmission/reception time of the TP. Accordingly, the UE may communicate with the plurality of TPs by dividing transmission and reception timings thereof appropriately for the transmission patterns of the TPs. In this case, the UE may be connected to and commu-

TABLE 5

| IE/Group Name | Presence | Range | IE type and reference | Semantics description |
|---|---|---|---|---|
| Invoke indication | M | | ENUMERATED (ABS Information, . . .) | — | nicate with each of the plurality of TPs of which transmission/reception timings are preconfigured not to overlap.

Figure 7:
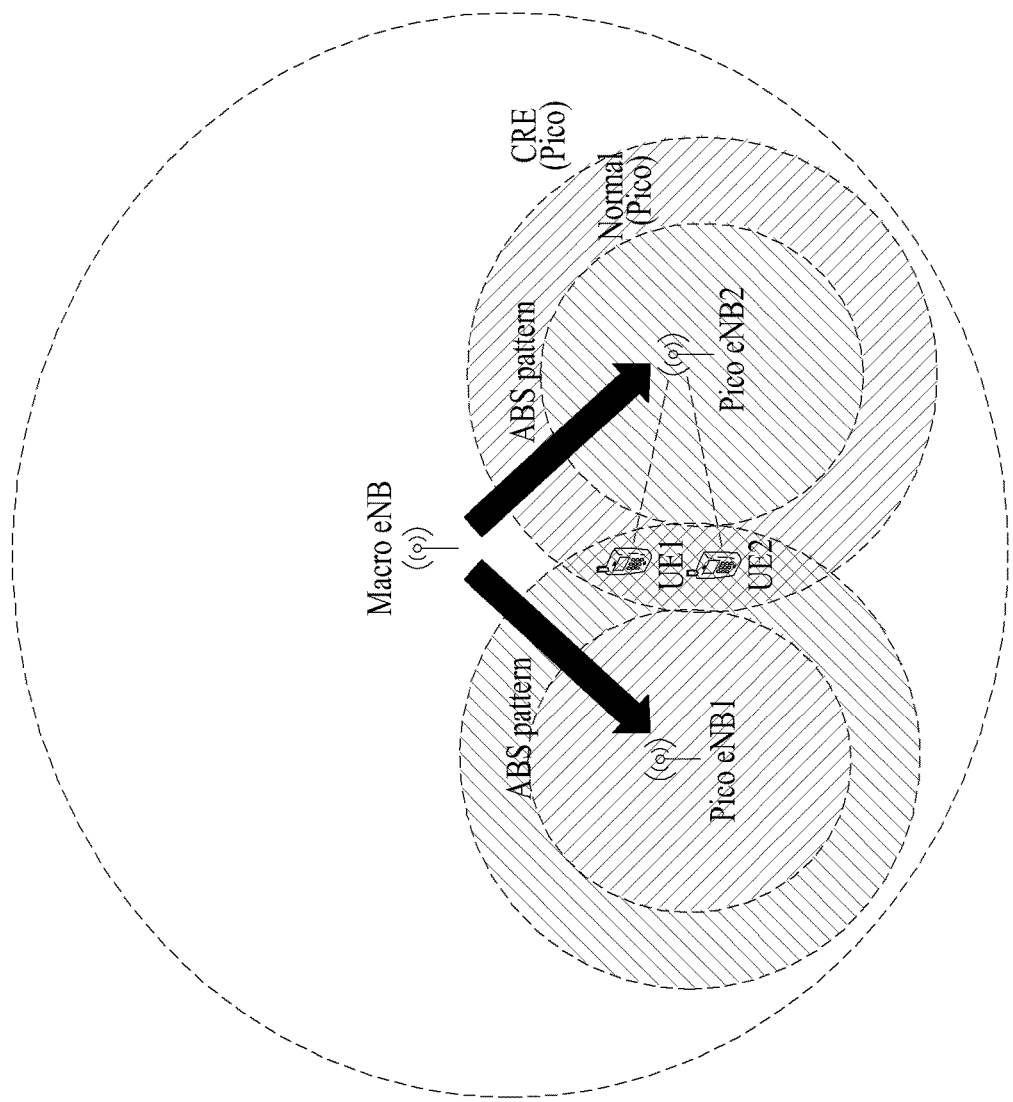
FIG. 7 is a diagram for a wireless communication environment related to one embodiment of the present invention.

FIG. 7 is a diagram for a communication system causing interference between neighboring cells. In particular, FIG. 7 shows interference between small scale cells (e.g., pico cells). Referring to FIG. 7, both a pico eNB1 and a pico eNB2 are positioned within a coverage of a macro eNB and the pico eNB1 and the pico eNB2 perform transmission/reception operation by receiving information on an ABS pattern of the macro eNB from the macro eNB. If an operation according to the ABS pattern is performed, interference from the macro eNB is reduced. Hence, each of the pico eNBs can obtain an effect of expanding a coverage of each of the pico eNBs. The expanded coverage is called CRE (cell range extension). Hence, a UE1 or a UE2 can make a handover to the pico eNB2 from the CRE region of the pico eNB2. By doing so, the UE1 or the UE2 can access the pico eNB2.

In FIG. 7, the macro eNB and the pico eNB1 correspond to an aggressor cell and the pico eNB2 corresponds to a victim cell in terms of the pico eNB2.

In general, an aggressor cell does not transmit data and UE-specific control information in a subframe configured as an ABS. Yet, the aggressor cell transmits a cell-specific reference signal (CRS) and cell-specific control information for an operation of a legacy UE. Hence, although interference in a data region is reduced using the ABS, the CRS and the cell-specific control information may continuously cause interference. In particular, when a UE intends to communicate with a victim cell at an outskirt of the victim cell, although the data region can be received with a low interference level, if information on a control region in which information for detecting the data region is included and a CRS are difficult to receive due to a high interference level, there may exist a problem of communication.

As mentioned in the foregoing description, in case of using a subframe configured as an ABS, a cell-specific control information and a CRS are continuously transmitted for an operation of a legacy UE. Yet, when a specific eNB is capable of managing a plurality of frequency carriers and a carrier aggregation (CA) scheme assigning a plurality of the frequency carriers to a single user equipment and enabling the single user equipment to use a plurality of the frequency carriers is used, if the specific eNB uses a specific frequency carrier as a SCC (secondary component carrier) only for UEs, which have accessed the specific eNB, the UEs does not need to read an RS and broadcast control information in every subcarrier in response to the specific frequency carrier. Hence, in this case, an eNB may not perform downlink transmission in a corresponding time frequency resource domain to resolve inter-cell interference of a heterogeneous network (HetNet). The time frequency resource region can be called a FBS (fully blank subframe) in terms of a subframe. A network or an eNB can configure a specific subframe as the FBS.

And, the FBS can be used to minimize power consumption of an eNB. When a specific eNB does not use a specific time frequency domain for communication with an UE, if a CRS and cell-specific control information are transmitted in every subframe, power of the eNB can be unnecessarily wasted. Yet, in order for the UE to search for a cell of the time frequency domain, it is necessary for the eNB to transmit the CRS and the cell-specific control information to the UE. Hence, in order to satisfy the aforementioned two requirements in an appropriate level, it is necessary to designate the FBS. By doing so, the eNB can minimize power consumption of the eNB in a manner of not transmitting the CRS and the cell-specific control information for a period designated as the FBS and can enable the UE to detect the corresponding cell in a manner of transmitting the CRS and the cell-specific control information to the UE.

The present specification intends to propose a method of defining an FBS corresponding a period for which the eNB does not perform transmission to mitigate inter-cell interference caused by the CRS and the cell-specific control information, a method of exchanging information on the FBS and an ABS between eNBs and a method of scheduling an UE based on the information.

The FBS defined by the present specification indicates a downlink subframe to which the eNB does not transmit any data thereto. In other word, the FBS corresponds to a subframe(s) in which the eNB does not perform downlink transmission not only in a data region but also a control region. In particular, the FBS indicates a subframe(s) of which downlink transmission power corresponds to 0 (zero). As mentioned in the foregoing description, no control information is transmitted in the FBS. If the FBS is configured, the eNB can minimize subframes, which used to transmit a CRS or cell-specific control information even when the eNB does not communicate with a UE, thereby reducing power consumption. In an aspect of the UE, the UE can communicate with a victim cell, which is serving the UE in a FBS period of an aggressor cell, with a low interference level.

According to LTE (-A) system of FDD scheme, since ABS is designated for 40 subframe patterns during a transmission interval of 40 ms in consideration of HARQ ACK/NACK transmission period of 8 ms and a radio frame transmission period of 10 ms, if an FBS is also designated by 40 ms unit similar to the ABS, compatibility with a legacy LTE (-A) system can be maintained.

Legacy ABS pattern information is transmitted via X2 interface between eNBs. Similar to the ABS pattern information, information for an FBS, e.g., FBS pattern information can also be exchanged between eNBs via the X2 interface.

The present specification defines three methods to designate transmission of an FBS.

Embodiment 1

An FBS can be used to reduce interference interfering a victim cell by an aggressor cell of relatively strong transmission power causing interference to a neighboring cell. When communication with a UE is not performed in such a small scale cell as a pico cell and a femto cell, the FBS can be used to reduce power consumption.

A method of defining an FBS pattern independent of an ABS pattern to designate an FBS according to one embodiment of the present invention is explained in the following.

Similar to a legacy ABS pattern, FBS pattern information of n-bit long can define FBS designation for n number of subframes. In this case, a form of an FBS pattern is identical to a form of an ABS pattern. "0" value designates a normal subframe (i.e., a subframe neither an ABS nor an FBS) and "1" value can designate an FBS. Of course, information indicated by a bit value is just an example. Information indicated by a bit value can be designated in opposite way.

If an ABS is designated in advance in a corresponding cell, it is able to define an FBS pattern identical to ABS pattern information in length. As mentioned in the foregoing description, it is preferable to designate an FBS pattern identical to an ABS pattern in length. This is intended to give compatibility between a legacy ABS operation and an FBS operation proposed by one embodiment of the present invention. For instance, if the FBS pattern and the ABS pattern are different from each other in length, i.e., if timing of updating the ABS and timing of updating the FBS are different from each other, more pressure on a processing load is to be put on an eNB and it will be necessary to have a separate process to solve the more increased pressure. In particular, according to one embodiment of the present invention, it is preferable to have the FBS pattern identical to the ABS pattern except a bit value indicated by the ABS pattern only. Yet, if it is difficult to satisfy all of the aforementioned requirements, it is preferable to have the FBS pattern identical to the ABS pattern in length.

In this case, there may exist two methods according to whether the FBS pattern is designated as a subset of a subframe set designated as ABS or a subframe set designated as non-ABS among the ABS pattern.

FIG. 8 shows an FBS pattern according to one embodiment of the present invention. FIG. 8 shows that an FBS is designated as a subset of a subframe set designated as ABS among ABS pattern. In the ABS pattern, a bit value 1 indicates that a corresponding subframe corresponds to an ABS. On the contrary, a bit value 0 indicates that a corresponding subframe corresponds to a normal subframe. Hence, according to one embodiment of the present invention related to FIG. 8, a subframe designated as the FBS can be configured as a part of a subframe designated as the ABS. Referring to FIG. 8, it is able to check that a FBS pattern is set to "1" in a part of subframes of a specific index indicating "1" among the ABS pattern. Hence, in the embodiment related to FIG. 8, if both the ABS pattern and the FBS pattern indicate a same subframe as "1", the subframe can be designated as an FBS.

FIG. 9 shows an FBS pattern according to one embodiment of the present invention. FIG. 9 shows that an FBS is designated as a subset of a subframe set designated as non-ABS among ABS pattern. Hence, in one embodiment of the present invention related to FIG. 9, a subframe designated as the FBS can be configured as a part of the non-ABS subframe. Referring to FIG. 9, it is able to check that a FBS pattern is set to "1" in a part of subframes of a specific index indicating "0" among the ABS pattern.

Embodiment 2

A different embodiment of the present invention corresponds to a method of defining a new pattern including an ABS and an FBS to designate the FBS.

According to the different embodiment of the present invention, it is able to define a new pattern designating one subframe per 2 bits. Among 2 bits designated to each subframe, "00", "01" and "10" can indicate a normal subframe, an ABS and an FBS, respectively. In addition, for instance, "11" may indicate transmission of a subframe transmitted by transmission power of a specific level different from downlink transmission power of a legacy cell. In particular, the 2 bits designated to each subframe consequently indicate downlink transmission power of each cell (or eNB). For instance, "00" indicates transmission power of a normal level, "01" indicates zero power in a data region and transmission of a very low level close to zero (0) in a control region, "10" indicates zero power in the data region and the control region, and "11" indicates transmission of a specific level. Meanwhile, the "11" can be reserved without a specific meaning for a future expandability.

FIG. 10 shows the aforementioned new pattern. In particular, in order to show a subframe type of each subframe, an indicator of 2 bits is designated for each subframe and the indicator of 2 bits is arrange to the total 10 subframes to generate a pattern. In particular, the new pattern can be designated using 2*n bits to designate n number of subframes as a pattern.

Embodiment 3

A further different embodiment of the present invention corresponds to a method of designating an FBS using period information on FBS transmission instead of a pattern for designating the FBS.

According to the further different embodiment of the present invention, the FBS can be designated using information on an FBS start subframe, an FBS period, FBS duration and an overlapped subframe.

The information on the FBS start subframe designates a number (or an index) of a subframe in which the FBS is to be started, the information on the FBS period designates a period of repeating the FBS by the number of subframes and the information on the FBS duration can include information on the number of designated subframes in which the FBS is repeated on each period.

Moreover, the FBS start subframe, the FBS period and the FBS duration may be associated with an ABS pattern. Hence, the FBS start subframe can be defined in a region (i.e., if the ABS pattern corresponds to a pattern of 40 bit-long, 40 subframes) indicated by the ABS pattern. In particular, the FBS start subframe may indicate a subframe firstly designated as an FBS in the region indicated by the ABS pattern.

According to a further different embodiment of the present invention, an ABS designated by an ABS pattern and an FBS designated by the aforementioned method can designate an identical subframe. In this case, it is necessary to have information on whether an eNB determines the identical subframe as an ABS subframe or an FBS. In particular, according to the further different embodiment of the present invention, it is necessary to have the information on the overlapped subframe. The information on the overlapped subframe can indicate whether a subframe indicated by the information on the FBS (e.g., the FBS start subframe, the FBS period and the FBS duration) is determined as an ABS subframe or an FBS subframe among subframes indicated by the ABS pattern.

If an eNB mainly uses an ABS to prevent a neighboring eNB from being interfered, it is profitable to use an overlapped subframe as an FBS subframe to avoid unnecessary power consumption of the eNB. When the eNB uses an ABS to transmit a CRS and cell-specific control information to detect a cell of a UE, if the eNB uses a subframe in which an ABS and an FBS are overlapped with each other as an FBS, a problem may occur in periodically transmitting control information. Hence, it may be profitable to designate the overlapped subframe as an ABS.

As mentioned in the foregoing description, determination on the overlapped subframe can be made according to a situation of an eNB in a manner of being profitable to the eNB. A criterion of the determination corresponds to the information on the overlapped subframe. For instance, if the information on the overlapped subframe indicates a value of "0", it can be determined as an ABS. If the information on the overlapped subframe indicates a value of "1", it can be determined as an FBS. In particular, "0" indicates an ABS and "1" indicates an FBS.

Related information (hereinafter "FBS-related information) according to the method of designating an FBS, which is proposed by the aforementioned embodiment 1 to embodiment 3, can be transmitted to a neighboring eNB via X2 interface by an FBS-designated eNB. Having received the related information according to the method of designating an FBS, the neighboring eNB estimates a subframe corresponding to an FBS of the FBS-designated eNB via the information and may be then able to use the subframe as information used for scheduling a UE, which has accessed the neighboring eNB, and information used for measuring a cell designated as an FBS.

In other word, the neighboring eNB can generate a specific field of downlink control information on a UE based on the FBS-related information to schedule the UE served by the neighboring eNB. In particular, the neighboring eNB can transmit resource allocation information for the UE which is generated based on the FBS-related information to the UE. By doing so, the UE can perform interference measurement in a corresponding subframe set based on the specific field.

Embodiment 4

If the FBS-related information is designated/configured based on the method defined in the foregoing description, it needs to make UEs search for a corresponding cell based on the FBS-related information. The FBS-related information designated in each cell can be delivered between eNBs via X2 interface.

If it is necessary for a UE to search for a signal for a neighboring cell designated as an FBS, each eNB transmits FBS-related information of the cell designated as the FBS to the UE before the UE performs cell search for the cell. By doing so, the UE can perform the cell search for normal subframes and ABS subframes of the cell except subframes designated as the FBS. Moreover, if it is necessary for the UE to perform a cell search for the subframes designated as the FBS, the UE may perform the cell search for the subframes designated as the FBS.

A scheme of delivering the FBS-related information of the specific cell to the UE can be classified into a method of directly delivering the FBS-related information of the specific cell to the UE and a scheme of delivering a restricted measurement set designated to measure a specific subframe to the UE. For instance, it is able to define a restricted measurement set 1 to a restricted measurement set 3 and the defined restricted measurement sets may indicate a normal subframe, an ABS subframe, and an FBS subframe, respectively. The restricted measurement set 1 to the restricted measurement set 3 can be provided to the UE.

Figure 11:
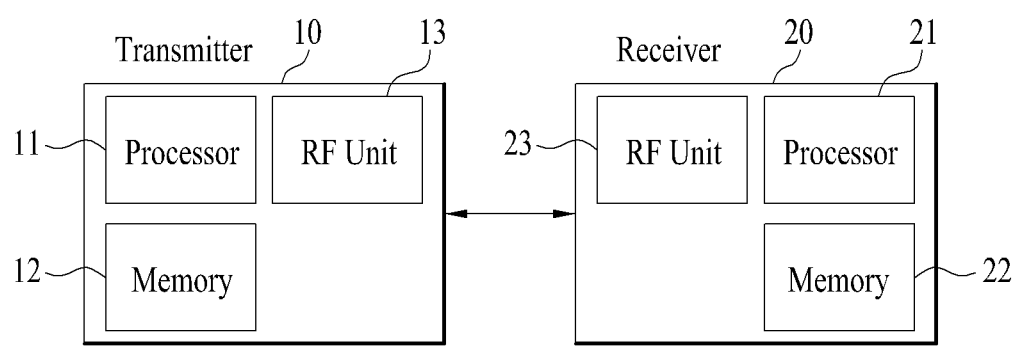
FIG. 11 is a block diagram for a device used for implementing embodiment(s) of the present invention.

FIG. 11 is a block diagram of apparatuses configured to perform a UL transmission-related operation according to an embodiment of the present invention. A transmitter 10 and a receiver 20 include Radio Frequency (RF) units 13 and 23 for transmitting or receiving a wireless signal carrying information and/or data, a signal, a message, etc., memories 12 and 22 for storing various types of information related to communication in a wireless communication system, and processors 11 and 21 connected operatively to components such as the RF units 13 and 23 and the memories 12 and 22, for controlling the memories 12 and 22 and/or the RF units 13 and 23 to perform at least one of the afore-described embodiments of the present invention.

The memories 12 and 22 may temporarily store programs for processing and control of the processors 11 and 21 and input/output information. The memories 12 and 22 may be used as buffers.

The processors 11 and 21 generally provide overall control to various modules in the transmitter 10 and the receiver 20. Particularly, the processors 11 and 21 may perform various control functions to implement the present invention. The processors 11 and 21 may be called controllers, microcontrollers, microprocessors, microcomputers, etc. The processors 11 and 21 may be achieved by hardware, firmware, software, or a combination thereof. In a hardware configuration, the processors 11 and 21 may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. that are configured to perform the present invention. In a firmware or software configuration, the firmware or the software may be configured to include a module, a procedure, a function, etc. that performs functions or operations of the present invention. The firmware or software configured to implement the present invention may be included in the processors 11 and 21 or may be stored in the memories 12 and 22 and executed by the processors 11 and 21.

The processor 11 of the transmitter 10 encodes and modulates a signal and/or data scheduled for transmission by the processor 11 or by a scheduler connected to the processor 11 in a predetermined coding and modulation scheme and transmits the coded and modulated signal and/or data to the RF unit 13. For example, the processor 11 converts a data stream to be transmitted to K layers by demultiplexing, channel coding, scrambling, modulation, etc. The coded data stream is called a codeword equivalent to a Transport Block (TB) which is a data block provided by a Medium Access Control (MAC) layer. A TB is encoded to a codeword and each codeword is transmitted in the form of one or more layers to a receiver. The RF unit 13 may include an oscillator, for frequency upconversion. The RF unit 13 may include $N_t$ transmission antennas ($N_t$ is a positive integer).

The receiver 20 processes a signal in reverse order of the signal processing of the transmitter 10 under the control of the processor 21. The RF unit 23 of the receiver 20 receives a wireless signal from the transmitter 10 under the control of the processor 21. The RF unit 23 may include Nr (a positive integer) reception antennas. The RF unit 23 recovers each signal received through the reception antennas to a baseband signal by frequency downconversion. The RF unit 23 may include an oscillator, for frequency downconversion. The processor 21 may recover the data transmitted by the transmitter 10 by decoding and demodulating wireless signals received through the reception antennas.

Each of the RF units 13 and 23 includes one or more antennas. The antennas transmit signals processed by the RF units 13 and 23 or receive external wireless signals and transmit the received wireless signals to the RF units 13 and 23, under the control of the processors 11 and 21. An antenna is also called an antenna port. Each antenna may correspond to one physical antenna or may include two or more physical antenna elements. The receiver 20 may not further decompose a signal transmitted by each antenna. An RS transmitted through an antenna defines the antenna from the viewpoint of the receiver 20. The RS enables the receiver 20 to perform channel estimation for the antenna irrespective of whether a channel is a single radio channel from one physical antenna or a composite channel from a plurality of physical antenna elements included in the antenna. That is, the antenna is defined so that a channel carrying a symbol from the antenna may be derived from a channel carrying another symbol from the same antenna. An RF unit supporting MIMO in which data is transmitted and received using multiple antennas may be connected to two or more antennas.

In the embodiments of the present invention, a UE or a relay operates as the transmitter 10 on UL and as the receiver 20 on DL. In the embodiments of the present invention, a BS operates as the receiver 20 on UL and as the transmitter 10 on DL.

A specific structure of a UE or a BS functioning as the above receiver or transmitter may be realized so as to apply the various embodiments of the present invention described before with reference to the attached drawings independently or to apply two or more embodiments of the present invention at the same time.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention are applicable to a terminal, a base station, or other devices in a wireless communication system.

What is claimed is:

1. A method of controlling interference between base stations, by a first base station in a wireless communication system, the method comprising:
    receiving FBS (fully blank subframe)-related information indicating at least one subframe of which transmission power of a downlink control region and a downlink data region is set to zero (0) from a second base station; and
    transmitting resource allocation information based on the FBS-related information to a user equipment,
    wherein the FBS-related information is determined based on ABS (almost blank subframe) pattern information of the second base station,
    wherein the FBS-related information comprises an overlapped subframe indicator, and
    wherein the overlapped subframe indicator corresponds to information indicating whether at least one subframe designated as both an ABS and an FBS is to be determined as an ABS or an FBS.

2. The method of claim 1, wherein the FBS-related information designates a part of at least one subframe, which is designated as the ABS by the ABS pattern information of the second base station, as the FBS.

3. The method of claim 1, wherein the FBS-related information further comprises an FBS start subframe, an FBS period, and an FBS duration,
    wherein the FBS start subframe corresponds to a number or an index of a subframe to be firstly designated as the FBS in the ABS pattern information of the second base station,
    wherein the FBS period corresponds to a period of repeating the FBS, and
    wherein the FBS duration corresponds to the number of subframes to be designated as the FBS for the FBS period.

4. The method of claim 1, further comprising:
    transmitting information on an interference measurement set based on the FBS-related information to the user equipment; and
    receiving a result measured in the interference measurement set from the user equipment.

5. A method of controlling interference between base stations, by a user equipment in a wireless communication system, the method comprising:
    receiving resource allocation information based on FBS (fully blank subframe)-related information from a first base station; and
    performing a cell search in a subframe determined as an FBS based on the FBS-related information,
    wherein the FBS-related information indicates at least one subframe of which transmission power of a downlink control region and a downlink data region is set to zero (0),
    wherein the FBS-related information is determined based on ABS (almost blank subframe) pattern information of a second base station neighboring to the first base station,
    wherein the FBS-related information comprises an overlapped subframe indicator, and
    wherein the overlapped subframe indicator corresponds to information indicating whether at least one subframe designated as both an ABS and an FBS is to be determined as an ABS or an FBS.

6. The method of claim 5, further comprising:
    receiving information on an interference measurement set based on the FBS-related information from the first base station; and
    transmitting a result measured in the interference measurement set to the first base station.

7. A base station controlling interference between base stations in a wireless communication system, comprising:
    an RF (radio frequency) unit; and
    a processor configured to control the RF unit,
    wherein the processor is configured to:
        receive FBS (fully blank subframe)-related information indicating at least one subframe of which transmission power of a downlink control region and a downlink data region is set to zero (0) from a second base station, and
        transmit resource allocation information based on the FBS-related information to a user equipment,
    wherein the FBS-related information is determined based on ABS (almost blank subframe) pattern information of the second base station,
    wherein the FBS-related information comprises an overlapped subframe indicator, and
    wherein overlapped subframe indicator corresponds to information indicating whether at least one subframe designated as both an ABS and an FBS is to be determined as an ABS or an FBS.

8. The base station of claim 7, wherein the FBS-related information designates a part of at least one subframe, which is designated as the ABS by the ABS pattern information of the second base station, as the FBS.

9. The base station of claim 7, wherein the FBS-related information further comprises an FBS start subframe, an FBS period, and an FBS duration,
    wherein the FBS start subframe corresponds to a number or an index of a subframe to be firstly designated as the FBS in the ABS pattern information of the second base station,
    wherein the FBS period corresponds to a period of repeating the FBS, and wherein the FBS duration corresponds to the number of subframes to be designated as the FBS for the FBS period.

10. The base station of claim 7, wherein the processor is configured to:
    transmit information on an interference measurement set based on the FBS-related information to the user equipment, and
    receive a result measured in the interference measurement set from the user equipment.

11. A user equipment controlling interference between base stations in a wireless communication system, the user equipment comprising:
    an RF (radio frequency) unit; and
    a processor configured to control the RF unit, the processor configured to:
        receive resource allocation information based on FBS-related information from a first base station, and
        perform a cell search in a subframe determined as an FBS based on the FBS-related information,
    wherein the FBS-related information indicates at least one subframe of which transmission power of a downlink control region and a downlink data region is set to zero (0),
    wherein the FBS-related information is determined based on ABS (almost blank subframe) pattern information of a second base station neighboring to the first base station,
    wherein the FBS-related information comprises an overlapped subframe indicator, and
    wherein the overlapped subframe indicator corresponds to information indicating whether at least one subframe designated as both an ABS and an FBS is to be determined as an ABS or an FBS.

12. The user equipment of claim 11, wherein the processor is configured to:
    receive information on an interference measurement set based on the FBS-related information from the first base station, and
    transmit a result measured in the interference measurement set to the first base station.

* * * * *